United States Patent

[11] 3,559,687

| [72] | Inventor | Wilfred Aslan<br>Mahwah, N.J. |
|---|---|---|
| [21] | Appl. No. | 717,829 |
| [22] | Filed | Apr. 1, 1968 |
| [45] | Patented | Feb. 2, 1971 |
| [73] | Assignee | Alkon Products Corporation<br>Wayne, N.J.<br>a corporation of New York |

[54] FLUID VALVE CONSTRUCTION
14 Claims, 10 Drawing Figs.

[52] U.S. Cl. .................................................. 137/625.69,
                                                                137/608
[51] Int. Cl. ................................................ F16k 11/07
[50] Field of Search ................................... 137/625.69,
                                                    382, 596, 382.5, 608

[56] References Cited
UNITED STATES PATENTS

| 1,521,628 | 1/1925 | Jones | 137/596 |
| 2,792,021 | 5/1957 | Greeley | 137/596 |
| 3,060,970 | 10/1962 | Aslan I | 137/625.69 |
| 3,151,630 | 10/1964 | Tennis | 137/625.69X |
| 3,324,892 | 6/1967 | Aslan II | 138/45 |
| 3,375,850 | 4/1968 | Aslan III | 137/382 |

*Primary Examiner*—M. Cary Nelson
*Assistant Examiner*—Robert J. Miller
*Attorney*—Pennie, Edmonds, Morton, Taylor and Adams

ABSTRACT: A fluid valve assembly having a valve body and valving mechanism movably mounted therein, a valve base supporting the valve body and clamping mechanism for attaching the valve body to the valve base in non-compressive relationship therewith.

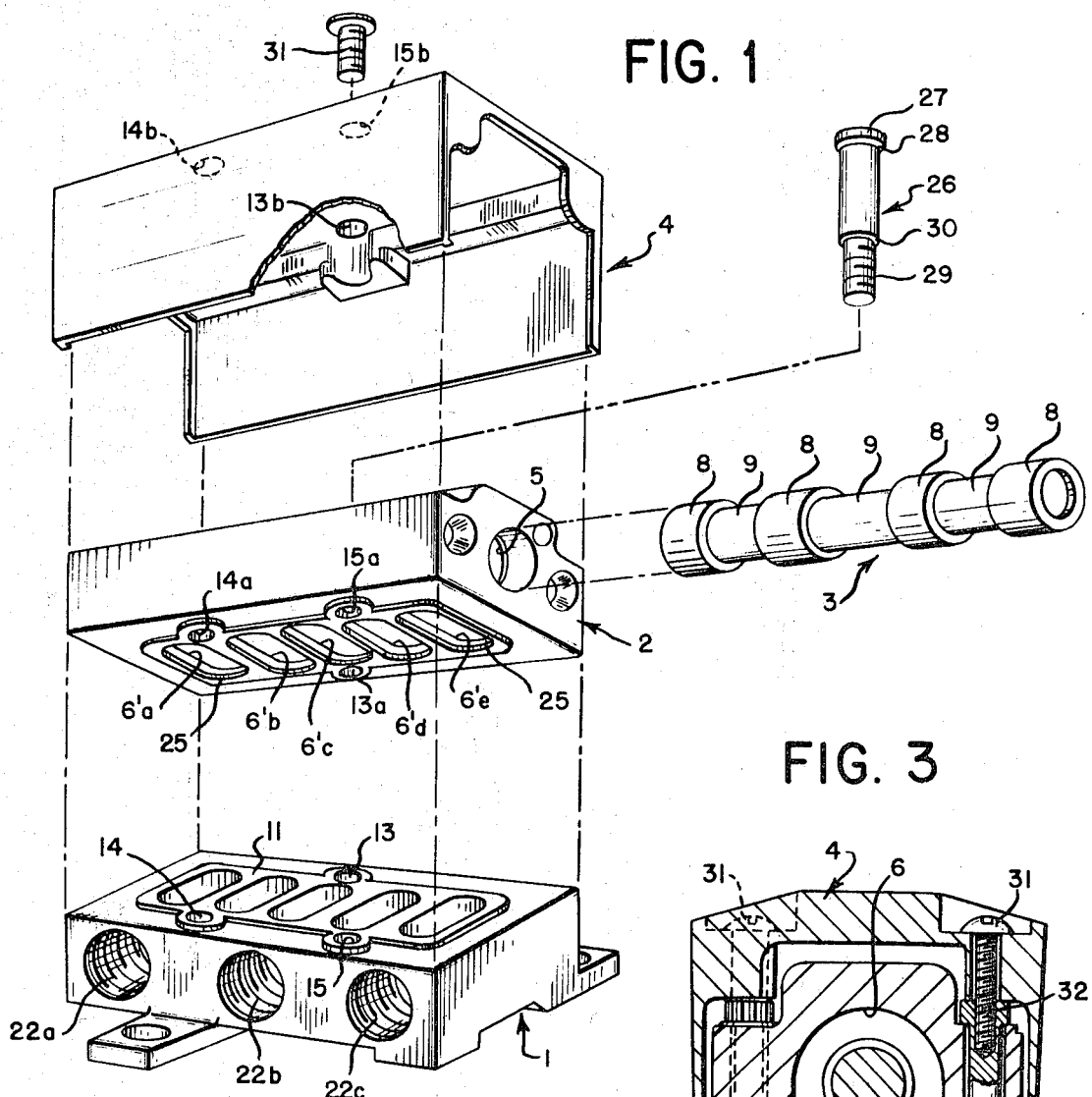
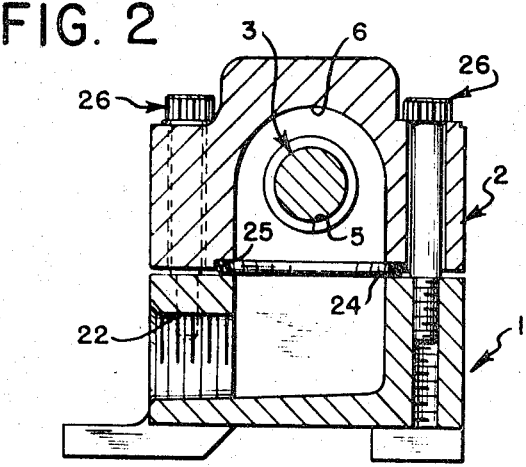
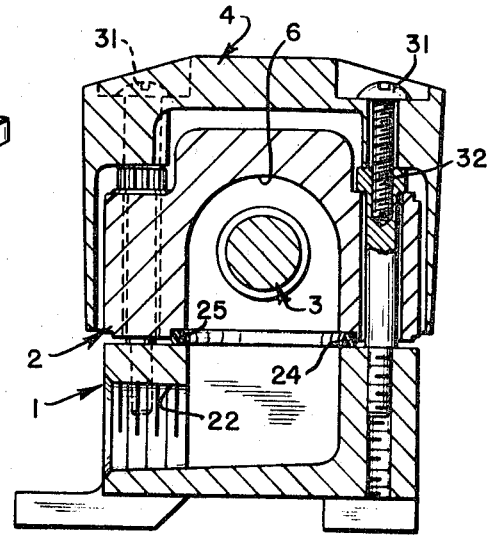
INVENTOR
Wilfred Aslan

PATENTED FEB 2 1971

INVENTOR
Wilfred Aslan
BY
ATTORNEYS

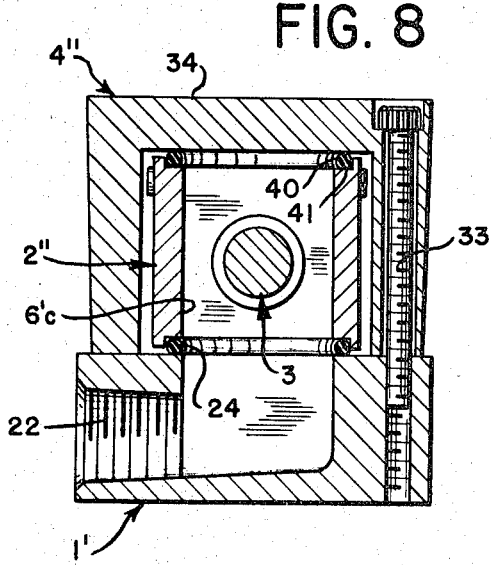
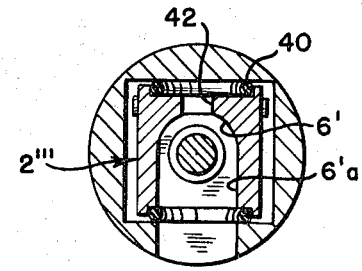
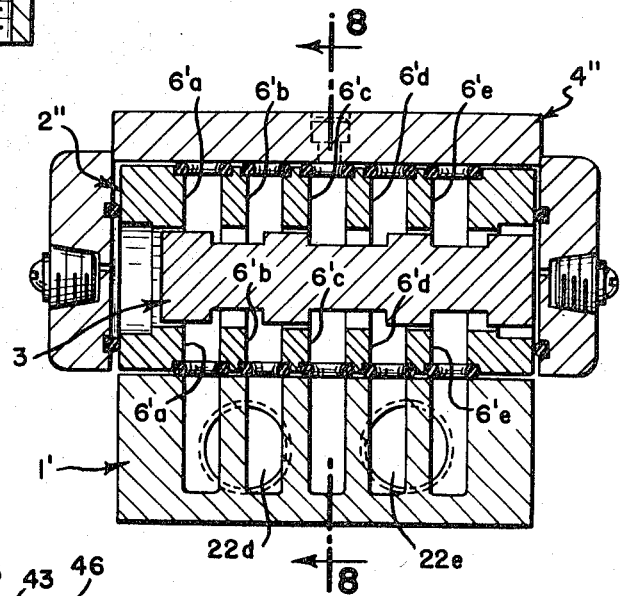
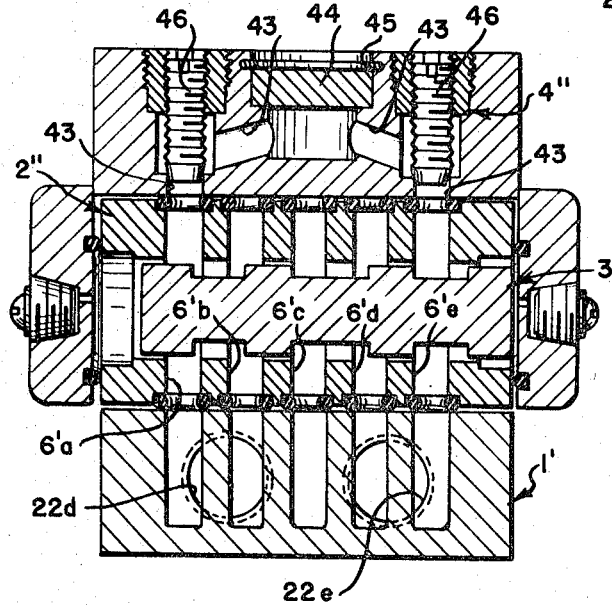

FLUID VALVE CONSTRUCTION

BACKGROUND OF THE INVENTION

1. Field of the Invention

This invention relates to fluid handling systems and more particularly to multiway valve units having closely fitting valve control means movably mounted within a valve body member.

1. Description of the Prior Art

In certain types of valves, malfunctioning of the active parts can be produced by minor distortion of the valve housing or body portion of the valve as might be caused during handling or use of the valve or during its assembly into a particular flow system. In my U.S. Pat. No. 3,060,970, granted Oct. 30, 1962 and in my copending application, Ser. No. 465,033 filed Jun. 18, 1965 and now U.S. Pat. No. 3,375,850 granted Apr. 2, 1968, I have described a spool type of valve construction in which metal-to-metal contact of cooperating surfaces of a valve spool within a surrounding valve body has been used to effectively control the flow of fluid through the valve. As described in these earlier patents, such metal-to-metal contact is made under conditions of very close tolerances in order to properly seal the spool within the valve housing; and although valves of this construction do eliminate the necessity of providing resilient sealing rings between the valve spool and body, they require that the valve be mounted into the flow system in which it is to be used in such a way whereby distortion of the active valve parts, in particular the valve body and housing, is avoided.

My prior patents are primarily concerned with the mounting of these types of valves, with or without an associated protective bonnet, onto a valve base member in such a way whereby distortion of their active parts is avoided. To accomplish this result, a three-point mounting construction, forming in effect a tripod support, is provided for supporting the valve along a single plane. In the valve assembly disclosed in my earlier U.S. Pat. No. 3,060,970, this three-point mounting is produced by providing the opposed surfaces of the valve body of the assembly and underlying support or valve base with three limited areas arranged in a triangular configuration and with the remaining portions of these opposed surfaces spaced from each other. Connection of the valve body to the underlying valve base is then accomplished by three tension bolts passing through holes in the valve body and into aligned holes in the valve base, these holes being arranged immediately adjacent to the limited areas of contact between the valve body and base. In the valve assembly disclosed in my prior U.S. Pat. No. 3,375,850, where a protective bonnet is connected over the valve body, this same three-point engagement between the valve body and underlying valve base is provided; and in addition, the bonnet is connected over the valve body with its own three-point engagement. In this bonnet construction, the tension bolts extend through both the bonnet and valve body and are threaded into the aligned holes in the underlying valve base.

In both of the valve assemblies disclosed in my earlier patents, the use of the tension bolts for drawing the valve body into clamped engagement with the underlying valve base and the bonnet into engagement with the valve body tends to introduce compressive stresses in the valve body at the points of contact with the underlying base and overlying bonnet. These stresses can, in turn, produce detrimental distortion of the valve body relative to the internally sliding valve mechanism and thereby cause malfunctioning. Although these compressive stresses can be controlled where the valves are factory assembled by experienced workmen using torque limiting devices for installing the tension bolts, this is not altogether satisfactory since even limited compressive stress in the valve body is undesirable. Also, where the valves are shipped to the ultimate user for field assembly, there is the greater possibility of too much torque being applied to the tension bolts due to workers' lack of proper instruction or lack of torque limiting devices. In addition, there is the problem created by thermal expansion of the parts of the valve assemblies during use. In construction, the tension bolts are normally made of steel while the valve body and bonnet are made of aluminum. Accordingly, as the temperature of the valve rises above that at which the assembly was made, the aluminum expands at about twice the rate of the steel bolts; and this increases the compressive stress in the valve body at the contact points with the bonnet and support.

In addition to the compressive stress that may be created in the valve body and cause undesirable distortion of the active parts of the valve assembly, the interior construction of the passageways in the valve body is such that unbalanced forces may be created along its axial length. These forces are created upon applying different pressures to different ports of the assembly and act against the upper interior walls of the passageways in the valve body tending to cause distortion thereof.

SUMMARY OF THE INVENTION

In accordance with the teachings of the present invention, distortion of the active parts of the valve assembly as caused by compressively connecting the bonnet to the valve body and the body to the underlying support is avoided. In addition, the valve body of the assembly is so constructed whereby all unbalanced forces, which would normally act against the body upon applying pressure of the valve ports, are removed. Generally, the valve assembly includes a valve body in which the movable active valve mechanism of the assembly is slidably disposed, a valve base for supporting the valve body, and connecting bolts extending loosely through the valve body and into the valve base. The bolts and the valve base are constructed with cooperating means for limiting axial movement of the bolts whereby when fully tightened, the axial distance between the bolt heads and the supporting surface of the valve base is greater than the thickness of the valve body disposed therebetween. Finally, resilient means are disposed between the lower surface of the valve body and the supporting surface of the valve base for urging the valve body upwardly against the bolt heads. The resilient means takes the form of O-rings surrounding the ports in the undersurface of the valve body and thus seals these ports to the associated ports in the valve base. With this construction, the valve body is securely connected to the valve base in a floating manner with undesirable compressive stresses in the valve body being avoided.

In the construction of the valve assembly where a protective bonnet is included, the floating relationship of the valve body is maintained by connecting the bonnet directly to the valve base. This result is accomplished by either connecting the bonnet to the bolts used to secure the valve body to the valve base or by employing separate bolts extending through the bonnet and into the valve base to compressively clamp the bonnet to the valve support. In the latter arrangement, the bolts usually used to secure the valve body to the valve base are eliminated and resilient means urge the valve body upwardly directly against the underneath surface of the bonnet.

In operation of the valve assembly of the present invention, pressurization of the various ports creates an upward thrust on the valve body. Where the ports are alternately pressurized or where this pressurization varies between different ports spaced axially along the valve body, the upward forces acting on the valve body will be unbalanced and tend to cause distortion thereof. With the valve assembly in which the protective bonnet is included, these local upward forces may be eliminated to provide a balanced valve body. In accordance with the teachings of the present invention, this balancing is effected by boring the ports completely through the valve body from its lower surface to its upper surface. The O-rings surrounding the ports on the lower surface are retained and additional O-rings are provided for surrounding the ports on the upper surface of the valve body. These upper O-rings engage against the opposed surface of the overlying bonnet and seal the ports from each other. With this construction, the valve body is not only secured to the valve base in a floating manner; but in addition, the upward force created by pressurization of any port passes directly through the valve body to act against the bonnet rather than the valve body thus eliminating any unbalancing of the valve body as would otherwise tend to occur.

BRIEF DESCRIPTION OF THE DRAWINGS

FIG. 1 is an exploded perspective view of one embodiment of the valve assembly of the present invention;

FIG. 2 is a transverse cross-sectional view of the embodiment of FIG. 1 assembled without a protective bonnet;

FIG. 3 is a transverse cross-sectional view of the embodiment of FIG. 1 assembled with a protective bonnet;

FIG. 7 is a longitudinal cross-sectional view of another embodiment of the valve assembly of the present invention;

FIG. 8 is a transverse cross-sectional view of the embodiment of FIG. 7;

FIG. 9 is a cross-sectional view showing a modified construction of the interior ports of the valve body of the assembly shown in FIG. 8; and FIG. 10 is a longitudinal cross-sectional view similar to FIG. 7 showing a modified construction of the valve bonnet of the assembly.

DESCRIPTION OF THE PREFERRED EMBODIMENTS

Figure 4:
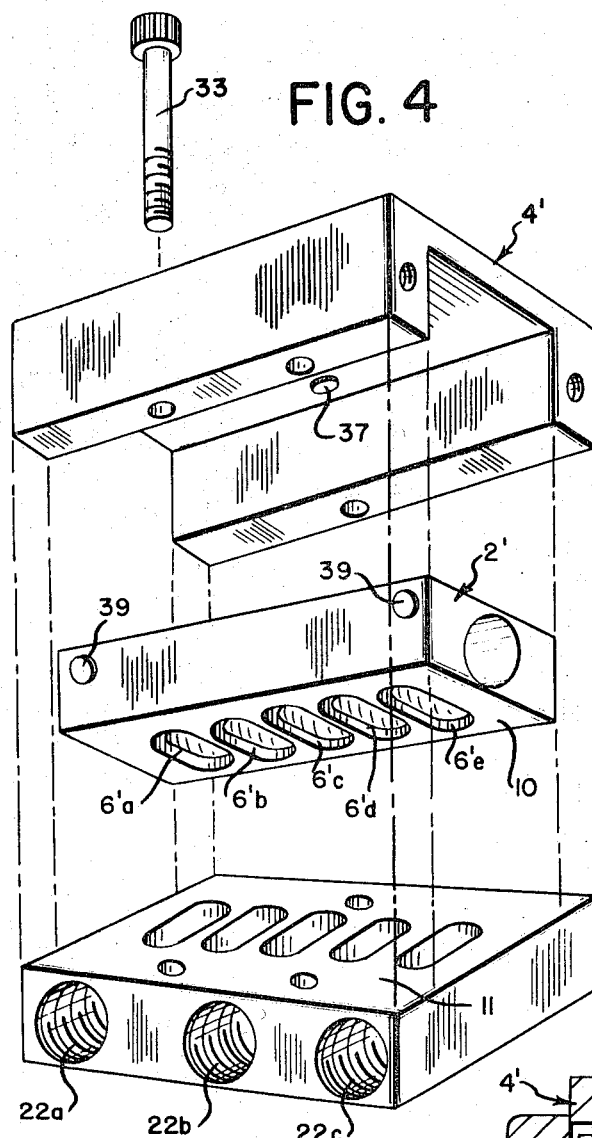
FIG. 4 is an exploded perspective view of another embodiment of the valve assembly of the present invention.

In the description of the various embodiments of the present invention as given below like reference numerals are used to designate identical structural features and parts while like reference numerals followed by primes are used to designate structural features and parts which are similar but not identical. Also, in describing a particular feature of one embodiment of the valve assembly of the present invention, reference is sometimes made to the drawing showing another embodiment for a showing of this particular feature it being understood that such feature is identical in both embodiments.

Figure 6:
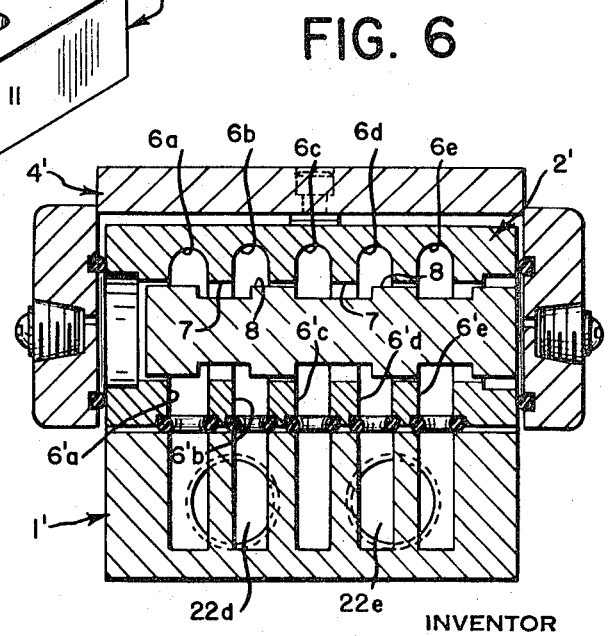
FIG. 6 is a longitudinal cross-sectional view of the embodiment of FIG. 4 in assembled condition.

As shown in the drawings, the valve assembly of the present invention generally includes a valve base 1, a valve body 2, a valve spool 3 adapted to reciprocate within a longitudinal bore provided in the valve body, and if desired, a valve bonnet 4. The valve body 2 is advantageously formed of a material such as 6061-T6 aluminum and may be in the form of a simple block provided with the longitudinal bore 5 and annular recesses 6a, 6b, 6c, 6d, 6e forming, in turn, valving lands 7 (FIG. 6). The active valving and sealing surfaces of the body 2, constituted by the lands 7, are treated to a condition of superhardness, by techniques well known in themselves. Various ports, such as illustrated at 6'a; 6'b; 6'c; 6'd; 6'e are provided in the valve body leading to the various recesses 6a—6e in accordance with well-known considerations, so that certain of the recesses communicate with a source of gas under pressure, other recesses communicate with a fluid motor, such as a cylinder (not shown), while still other ports communicate with exhaust.

Slidably received in the bore 5 of the valve body is the valving spool 3 which is formed of a material similar to that used in the body 2. The spool 3 is cylindrical in shape and is provided with a plurality of annular lands 8 and recesses 9. The outer surfaces of the lands 8 are treated to a condition of superhardness and are precision machined to fit very closely with the lands 7 of the valve body whereby effective valving action may be achieved without the use of resilient sealing elements, such as O-rings.

Effective operation of a valve comprised of surface hardened aluminum body and spool members, utilizing substantial metal-to-metal sealing contact and eliminating entirely the use of resilient sealing elements requires extremely precise initial machine work in order to obtain the low clearances necessary to contain a gas, as distinguished from a hydraulic fluid, for example. The valve body 2 is advantageously provided with a flat bottom surface 10 substantially complementary to a substantially flat upper surface 11 of the valve base 1; and as shown in FIG. 1, the valve base is preferably provided with three triangularly oriented tapped holes 13—15 aligned with similar untapped holes 13a—15a in the valve body 2.

As illustrated in FIG. 1, suitable porting bores 11a, 22b, 22c are provided in the valve base 1 for communication with the ports 6'a, 6'c, 6'e, respectively, provided in the valve body while porting bores 22d, 22e, shown in FIGS. 6, 7 and 10, are provided for communication with the ports 6'b, 6'd respectively. The connection between these various ports is sealed at the interface between the valve body and base by means of resilient annular seals 24 (FIG. 2) received in recesses 25 provided at the lower ends of the ports 6'a—6'e of the valve body. When undistorted, the seals 24 project below the lower surface of the valve body.

In a typical application of a valve structure incorporating the features described above, the valve spool 3 is actuated between its operative valving positions by suitable valve actuating mechanism such as solenoids and springs as described in my prior patents.

As shown in FIGS. 1 and 2, the valve body is connected to the underlying valve base by securing means in the form of fastening elements 26. These fastening elements are in the form of shouldered bolts having a bolt head 27 defining a downwardly facing flange 28 and a threaded end 29 of reduced cross section defining a lower flange 30. The fastening elements are passed through the untapped holes 13a—15a in the valve body and are threaded into the aligned tapped holes 13—15 in the valve base. As shown in FIG. 2, the axial distance between the two flanges 28 and 30 of the fastening elements is greater than the thickness of the valve body disposed therebetween. Accordingly, when the bolt fastening elements are threaded the maximum extent into the tapped holes in the valve base; that is, until the flange 30 engages against the upper surface of the valve base, the valve body will not be compressively clamped to the valve base. Instead the resilient annular seals 24 will hold the valve body above the upper surface of the valve base and urge it against the upper flanges 28 of the fastening elements. Thus, the valve body is connected to the valve base in a floating manner and is not subject to stresses that would otherwise be caused by compressively clamping the valve body directly to the valve base.

The axial clearance, as measured along the longitudinal axes of the fastening elements, between the lower surface of the valve body and the upper surface of the valve base, is in the order of 0.008 inch. This will allow for expansion of the valve body under high temperature operation without closing down the clearance. The clearance is also small enough so that the resilient annular seals 24 will not be extruded through the clearance. As also shown in FIG. 2, there is a slight clearance between the shouldered portion of the fastening elements and the untapped holes of the valve body to further allow for any expansion of the valve body due to the temperature changes. To take advantage of the three-point triangular engagement between the valve body and the associated parts of the assembly as described in my previous patents, three fastening elements may be used. In this way, engagement of the valve with the bolt heads is at three points in a single plane and engagement of the resilient annular seals is also at three points on the underlying valve base.

In the construction of the valve assembly in which a protective valve bonnet is employed as described in my prior U.S. Pat. No. 3,375,850, such bonnet is connected directly to the valve base rather than to the valve body. In this way, the floating condition of the valve body is maintained. FIG. 3 shows one embodiment of the invention in which a protective bonnet is included. As there shown tension fastening elements 31 are provided. These elements extend through holes 13b—15b in the bonnet which are aligned with the untapped holes 13a—15a in the valve body and thus with the fastening elements 26 which are provided with threaded holes 32 for their reception. In this way, the bonnet may be securely clamped to the fastening elements 26 without disturbing the floating condition of the valve body.

Figure 5:
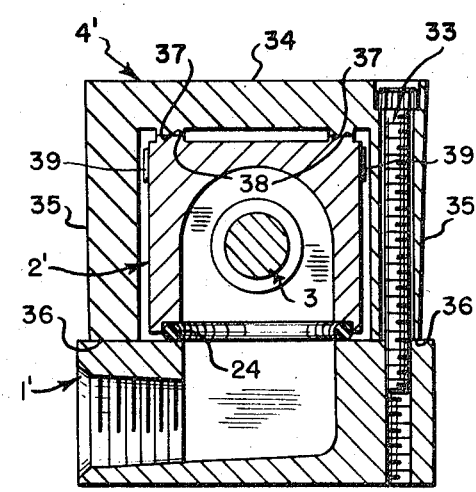
FIG. 5 is a transverse cross-sectional view of the embodiment of FIG. 4 in assembled condition.

In another embodiment of the valve assembly constructed in accordance with the teachings of the present invention, the valve body is held in a floating manner on the valve base by means of a protective bonnet and associated fastening elements which together define the securing means for the valve body. This construction is shown in FIGS. 4, 5 and 6 as including a bonnet 4' which is connected rigidly to the valve base 1' by way of tension fastening elements 33. The bonnet includes a top wall portion 34 and sidewall portions 35 extending downwardly therefrom at substantially right angles in spaced relation to the valve body and terminating in lower ends 36 adapted to rest on the upper surface of the valve base. The vertical distance between the ends 36 and the underneath surface of the top portion of the bonnet is greater than the vertical thickness of the valve body 2'. Thus, clamping of the bonnet to the valve base and about the valve body will permit the valve body to assume a floating relationship relative to the valve base with the resilient annular seals 24 urging the body into engagement with the underneath surface of the top portion 34. The top wall portion and the sidewall portions of the bonnet may be formed as separate elements, if desired. Also, the sidewall portions may be connected to the valve body by flexible strut members. Such a construction may be found advantageous in permitting the valve body and sidewall portions to be cast in one operation. Where such a construction is used, however, the struts would be made flexible enough so as to permit relative movement between the valve body and sidewall of the bonnet and to thus permit the valve body to assume a floating relationship relative to the valve base in the completed assembly. Where strut members are employed to flexibly connect the spaced sidewall portions of the bonnet to the valve body, they are disposed at acute angles between these two members rather than at right angles so that any distortive forces applied to the sidewalls will not cause distortion of the valve body and will instead be taken up by flexing of the strut members. Preferably, two strut members are provided on each side of the valve body, one adjacent each end of the valve body and each at a different height.

In construction of the embodiment shown in FIGS. 4, 5 and 6, the underneath surface of the top portion 34 of the bonnet includes three raised lands 37 defining spacer elements, two of which are shown in FIG. 5. These lands are aligned with raised lands 38 on the top of the valve body to limit the contact between the valve body and the bonnet. As an alternative, the lands may be formed on only the valve body or on only the bonnet; and where these lands are formed on the bonnet, they define the underneath surface of the top wall portion 34. As also shown in FIGS. 4 and 5, the sides of the valve body are provided with raised lands or spacer elements 39 to limit the contact area between the valve body and the sides of the bonnet to small points in the event that the body slides to one side or another.

The inclusion of the various lands allows a large clearance in the order of one thirty-seconds of an inch, between the valve body and most of the area of the valve bonnet thereby allowing for thermal expansion of the valve body and permitting deformation of the bonnet by the fastening elements 33 and other causes such as external blows without also causing deformation of the valve body. In the construction shown in FIGS. 4, 5 and 6, the location of the fastening elements in the bonnet outside of the valve body permits the use of a bonnet having thicker sidewalls while still maintaining the valve body enclosed in a protective fashion. By increasing the amount of energy absorbing material in the bonnet, damage to the operative parts of the valve by misuse or external blows is further avoided.

With the valve assembly constructed in the manner set out above, pressurization of the various ports 6' a—6' e creates an upward thrust on the valve body. In order to avoid this upward thrust which may tend to distort the valve body when the pressurization is alternately applied to the various ports or when the pressurization varies between the ports, the upper walls of the annular recesses 6a—6e are bored through to the upper surface of the valve body. As shown in FIGS. 7 and 8, this boring extends the ports 6' a—6' e completely through the valve body from its lower surface to its upper surface. In the valve body shown in FIGS. 7 and 8, the construction is identical to that shown in FIGS. 4, 5, and 6 except for this through boring. With each of the ports 6' a—6' e being bored through the valve body, it is necessary to provide sealing means to seal these ports from each other at the upper surface of the valve body and to also prevent leakage from around the protective bonnet. For this purpose, resilient annular seals 40 are provided and received within recess 41 formed about the upper end of the ports 6' a—6' e. When undistorted, the seals 40 project above the upper surface of the valve body. Thus, when assembled, the valve body is resiliently held between the underlying valve base and the overlaying bonnet with the seals 24 and 40 engaging against the valve body and bonnet, respectively, as shown in FIG. 8. With this construction, pressurization of any one of the ports will cause the upward force created thereby to act directly against the aligned underneath surface of the top portion 34 of the bonnet rather than against the valve body. Thus creation of localized forces of varying amounts on the valve body axially of the valve spool is prevented.

In FIG. 9, there is shown an alternative construction of the valve body which is suitable for preventing creation of unbalanced upward forces acting on the body and tending to distort it. In FIG. 9, only one valve port 6' is shown, however it is to be understood that the remaining ports 6' b—6' e will be of the same construction and include a bore 42 extending through to the upper surface of the valve body. As compared to the construction shown in FIGS. 7 and 8 where the boring of the valve body is effected to produce ports 6' a—6' e of uniform dimension, the port 42 in the recess 6a shown in FIG. 9 is of reduced size. With this construction, it is necessary that the total exposed area of the valve body along its upper surface surrounding the port 42 and within the boundary of the seal 40 be equal to the remaining lower surface of the annular recesses 6a. In this way, the force created by pressurization of this particular port and acting upwardly against the surface of the recess 6a of the valve body will be balanced by the force acting downwardly on the upper surface of the valve body within the boundary of the seal 40. Accordingly, pressurization of the various ports axially of the valve spool to different values or alternatively will have no unbalancing effect on the valve body.

The valve assemblies described above may be operated as three-way, four-way or five-way valves. Four-way valves are most generally used to operate double acting cylinder units that is one that operates by alternately applying pressure to either side of the piston of the cylinder unit. Also, four-way valves may be connected into the system in which it is to be used with either a common exhaust or separate exhausts for each cylinder port. Where separate exhausts are used, speed control of the double acting cylinder unit can be obtained by metering the flow through the exhaust ports. For effecting this result, the valve assembly of the present invention is provided with a modified bonnet as shown in FIG. 10. The central port 6'c of the valve body is pressurized through the central bore 22b in the valve base while the intermediate ports 6'b and 6'd of the valve body are connected to the opposite ends of the double acting cylinders through the two bores 22d and 22e respectively, of the valve base. Finally, the end bores 6'a and 6'e of the valve body are connected to exhaust through the bores 22a and 22c of the valve base.

In order to control for metering the exhaust through the valve assembly shown in FIG. 10, the normal exhaust bores 22a and 22c are sealed and the overlying bonnet 4'' is provided with outlet ports 43 aligned with the end ports 6'a and 6'e of the valve body. These two ports 43, are, in turn, exposed to atmosphere through a muffler 44 disposed in a recess on the upper surface of the bonnet. Retention of the muffler in this recess is accomplished by a retaining ring 45. As shown in FIG. 10, each of the exhaust ports 43 are provided with metering screws 46; and by adjusting the axial position of these screws, the exhaust through either of these ports 43 may be readily metered. In this way, the speed of operating the double acting air cylinder in either direction may be adjusted. The construction of the metering screws is preferably the same as that described in my U.S. Pat. No. 3,324,892 granted Jun. 13, 1967, although it is not necessary that the metering screws be sealed as disclosed in that patent.

The description of the valve assembly in which metering of the exhaust is provided for has been made with reference to a four-way valve having separate exhausts. However, it is to be understood that the metering of the exhaust through a common port may also be effected if desired by constructing the bonnet with an exhaust port aligned with the common exhaust port of the valve body.

I claim:

1. In a fluid valve assembly having a valve body with a close fitting valve mechanism slidably received therein for movement to a plurality of operative valving positions, and an underlying valve base for connecting the valve assembly into a flow system and having an upper supporting surface for supporting said valve body thereon, the improvement comprising:
    a. securing means extending from the upper surface of said valve body downwardly into secured engagement with said valve base, said securing means engaging the upper surface of said valve body for restraining it against upward movement away from said valve base with the distance between the upper supporting surface of the valve base and the upper surface of the valve body at the points of engagement with said securing means being greater than the thickness of the valve body disposed therebetween;
    b. positive means for maintaining said distance greater than said thickness; and
    c. resilient means positioned between said valve body and the upper supporting surface of said valve base and in engagement therewith for maintaining said valve body in spaced relation above said valve base and for resiliently urging said valve body upwardly into engagement with said securing means, said resilient means providing the sole contact between said valve base and the lower surface of the valve body spaced thereabove.

2. In a fluid valve assembly having a valve body with a close fitting valve mechanism slidably received therein for movement to a plurality of operative valving positions, and an underlying valve base having an upper supporting surface for supporting said valve body thereon, the improvement comprising:
    a. securing means comprising a plurality of bolt fastening elements extending through said valve body from the upper surface thereof downwardly into secured engagement with said valve base, each of said bolt fastening elements including:
        1. a bolt head defining a first flange portion engaging against the upper surface of said valve body for restraining it against upward movement away from said valve base;
        2. a threaded end of reduced cross section for engagement in an aligned threaded hole in said valve base and defining a second flange portion for engaging against the upper supporting surface of said valve base with the axial distance between said flanges being greater than the thickness of said valve body disposed therebetween; and
    b. resilient means positioned between said valve body and the upper supporting surface of said valve base and in engagement therewith for maintaining said valve body in spaced relation above said valve base and for urging said valve body upwardly into engagement with said securing means.

3. The improvement in the fluid valve assembly according to claim 2 further comprising:
    a. a protective valve bonnet disposed in covering relationship over said valve body and seated on the bolt heads of said bolt fastening elements in spaced relationship relative to said valve body; and
    b. tension fastening elements extending through said bonnet from the upper surface thereof and into threaded engagement in the underlying bolt fastening elements for drawing said bonnet into engagement with said bolt heads.

4. The improvement in the fluid valve assembly according to claim 2 wherein:
    a. said securing means includes three of said bolt fastening elements arranged in triangular configuration.

5. The improvement in the fluid valve assembly according to claim 4 wherein:
    a. said valve body includes holes extending therethrough for receiving said bolt fastening elements, said holes being larger in diameter than the diameter of said bolt fastening elements.

6. In a fluid valve assembly having a valve body with a close fitting valve mechanism slidably received therein for movement to a plurality of operative valving positions, and an underlying valve base having an upper supporting surface for supporting said valve body thereon, the improvement comprising:
    a. securing means extending from the upper surface of said valve body downwardly into secured engagement with said valve base, said securing means engaging the upper surface of said valve body for restraining it against upward movement away from said valve base with the distance between the upper supporting surface of the valve base and the upper surface of the valve body at the points of engagement with said securing means being greater than the thickness of the valve body disposed therebetween, said securing means comprising:
        1. a protective valve bonnet disposed in covering relationship over said valve body with sidewall portions extending downwardly in spaced relationship with said valve body and with the lower ends thereof in engagement with the upper supporting surface of said valve base; and
        2. a plurality of fastening elements securing said valve bonnet rigidly to said valve base; and
    b. resilient means positioned between said valve body and the upper supporting surface of said valve base and in engagement therewith for maintaining said valve body in spaced relation above said valve base and for urging said valve body upwardly into engagement with said securing means.

7. The improvement in the fluid valve assembly according to claim 6 further including:
    a. a plurality of spacer elements disposed between the upper surface of said valve body and the overlying wall of said valve bonnet.

8. The improvement in the fluid valve assembly according to claim 7 wherein:
    a. three spacer elements arranged in triangular configuration are provided.

9. The improvement in the fluid valve assembly according to claim 8 further including:
    a. a plurality of spacer elements disposed between said valve body and the sidewall portions of said valve bonnet.

10. In a fluid valve assembly having a valve body formed of distortable material with a longitudinal bore therein and valve ports extending from the lower surface thereof into communication with said bore, a valve spool slidably received in said bore and movable to a plurality of operative valving positions to connect the valve ports in predetermined combination, cooperating valving surfaces on said valve body and spool for sealing off certain ports from certain other ports in the various operative positions of said spool, and a valve base for supporting said valve body thereon, the improvement comprising:

a. a protective valve bonnet with a top wall portion disposed in overlying relationship with said valve body and with sidewall portions extending downwardly in spaced relationship with said valve body with the lower ends thereof in engagement with the upper supporting surfaces of said valve base, the distance between the undersurface of the top wall of said bonnet and the upper supporting surface of said valve base being greater than the thickness of the valve body disposed therebetween;

b. a plurality of fastening elements securing said valve bonnet rigidly to said valve base;

c. resilient means positioned between said valve body and the upper supporting surface of said valve base and in engagement therewith for maintaining said valve body in spaced relation above said valve base and for urging said valve body upwardly toward the undersurface of the top wall of said bonnet;

d. valve ports extending from the upper surface of said valve body and communicating with the valve ports extending from the lower surface of said valve body; and e. resilient means positioned between said valve body and the undersurface of the top wall of said bonnet and in engagement therewith for maintaining said valve body in spaced relation with the top wall of said bonnet.

11. The improvement in the valve assembly according to claim 10 wherein:

a. said resilient means comprises annular seals surrounding each of said valve ports on the lower and upper surfaces of said valve body.

12. The improvement in the valve assembly according to claim 11 wherein:

a. said valve ports are of uniform cross-sectional dimension from the lower surface of said valve body to the upper surface thereof.

13. The improvement in the valve assembly according to claim 11 wherein:

a. the valve ports extending from the upper surface of said valve body are of a size smaller than the valve ports extending from the lower surface of said valve body; and b. the upper surface of said valve body within the boundary of each of said annular seals is equal to the downwardly facing surface surrounding each of said ports internally of said valve body.

14. The improvement in the valve assembly according to claim 13 further including:

a. at least one port in said bonnet in communication with a valve port extending from the upper surface of said valve body; and b. metering valve means disposed within each of the ports in said bonnet for varying the flow of fluid therethrough.